May 17, 1927.
C. H. BERRY
1,629,063
TERMINAL DIFFERENCE GAUGE
Filed April 16, 1924   3 Sheets-Sheet 1
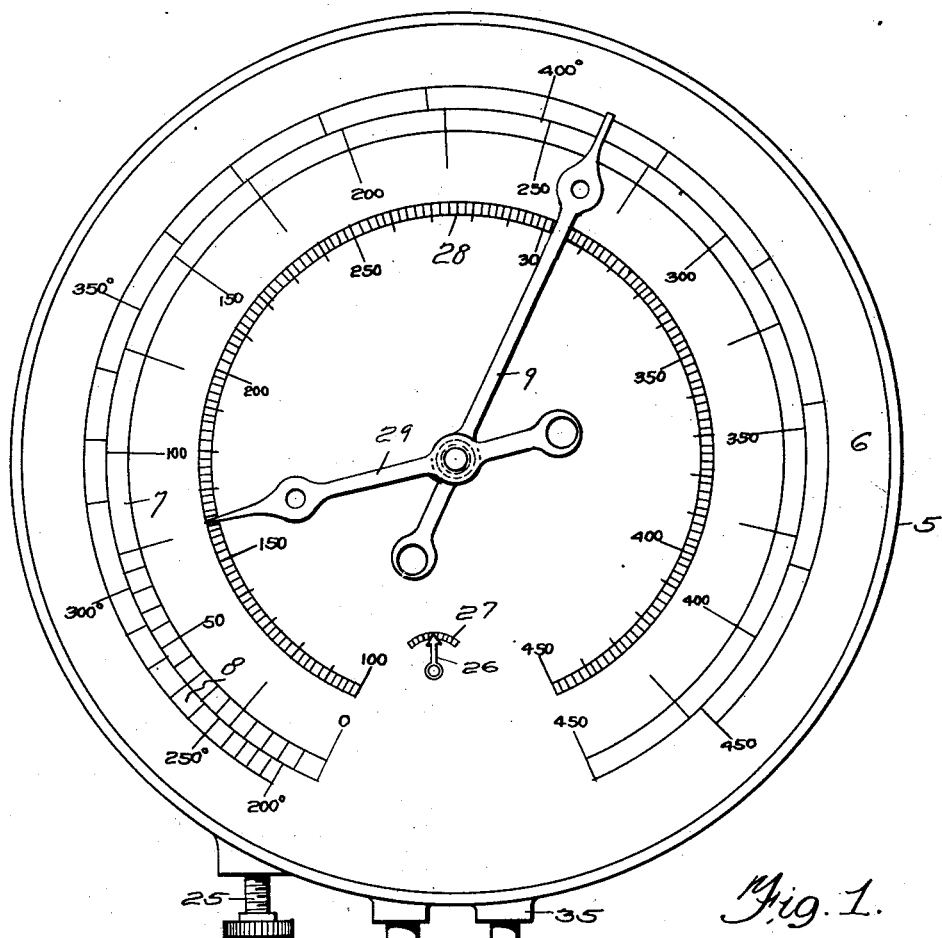
Fig. 1.
Inventor
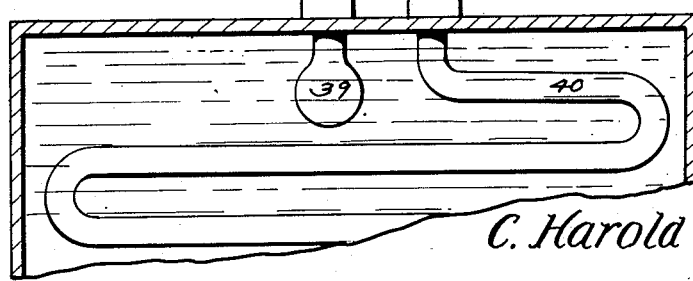
Attorneys May 17, 1927.

C. H. BERRY 1,629,063

TERMINAL DIFFERENCE GAUGE

Filed April 16, 1924  3-Sheets-Sheet 2.

Inventor

C. Harold Berry,

By Shepherd Caughell

Attorneys

May 17, 1927.

C. H. BERRY 1,629,063

TERMINAL DIFFERENCE GAUGE

Filed April 16, 1924     3 Sheets-Sheet 3

Inventor
C. Harold Berry,
By Shepherd & Campbell
Attorneys

Patented May 17, 1927.

1,629,063

UNITED STATES PATENT OFFICE.

CHARLES HAROLD BERRY, OF DETROIT, MICHIGAN.

TERMINAL-DIFFERENCE GAUGE.

Application filed April 16, 1924. Serial No. 706,951.

This invention relates to a terminal difference gauge. The primary object of the invention is to provide, in a unitary structure, means for indicating the true difference in temperature between the medium being utilized for purposes of heating in a heat transfer device and the temperature of the medium being heated by such transfer device.

In United States Patent 1,413,514 issued to me April 18, 1922, I disclosed a gauge having a dial graduated in such manner as to indicate the boiling point temperature corresponding to the pressure of the steam or other vapor. Furthermore said patent embodies means for automatically compensating for variations in atmospheric pressure so that the pressure indication upon the gauge at any given time represents the true or absolute pressure at the then existing atmospheric pressure, the zero point of the gauge corresponding to a vacuum.

In United States Patent 1,444,098 issued to me on February 6, 1923, I disclosed an absolute pressure gauge of the same general character as that above indicated, except that the compensation for variations in atmospheric pressure was effected by shifting the pointer of the gauge rather than by shifting the dial as indicated in the patent first referred to.

According to the present invention I combine with a gauge of the absolute pressure type disclosed in my patents aforesaid, an indicating or thermometer pointer, said gauge having two points of connection, one adapted to be connected to a line through which steam or other vapor is being introduced into a heat exchanger, and the other being adapted to be connected with the medium being heated in said heat exchanger, the arrangement being such that the absolute pressure pointer will indicate the true or absolute pressure, and consequently the true temperature of the heating medium while the thermometer pointer will indicate the temperature of the medium being heated, the difference between these two being what is known as the "terminal difference", and which terminal difference is an important guide in the operating control of various processes. Furthermore the extent to which the temperature of the medium being heated approaches the temperature of the heating medium is a direct measure of the effectiveness of the apparatus and of the heat transfer process.

Further objects and advantages of the invention will be set forth in the detailed description which follows.

In the accompanying drawings:

Fig. 1 is a front elevation of a gauge, constructed in accordance with the invention and with a heat exchanger diagrammatically indicated in section.

Figure 2:
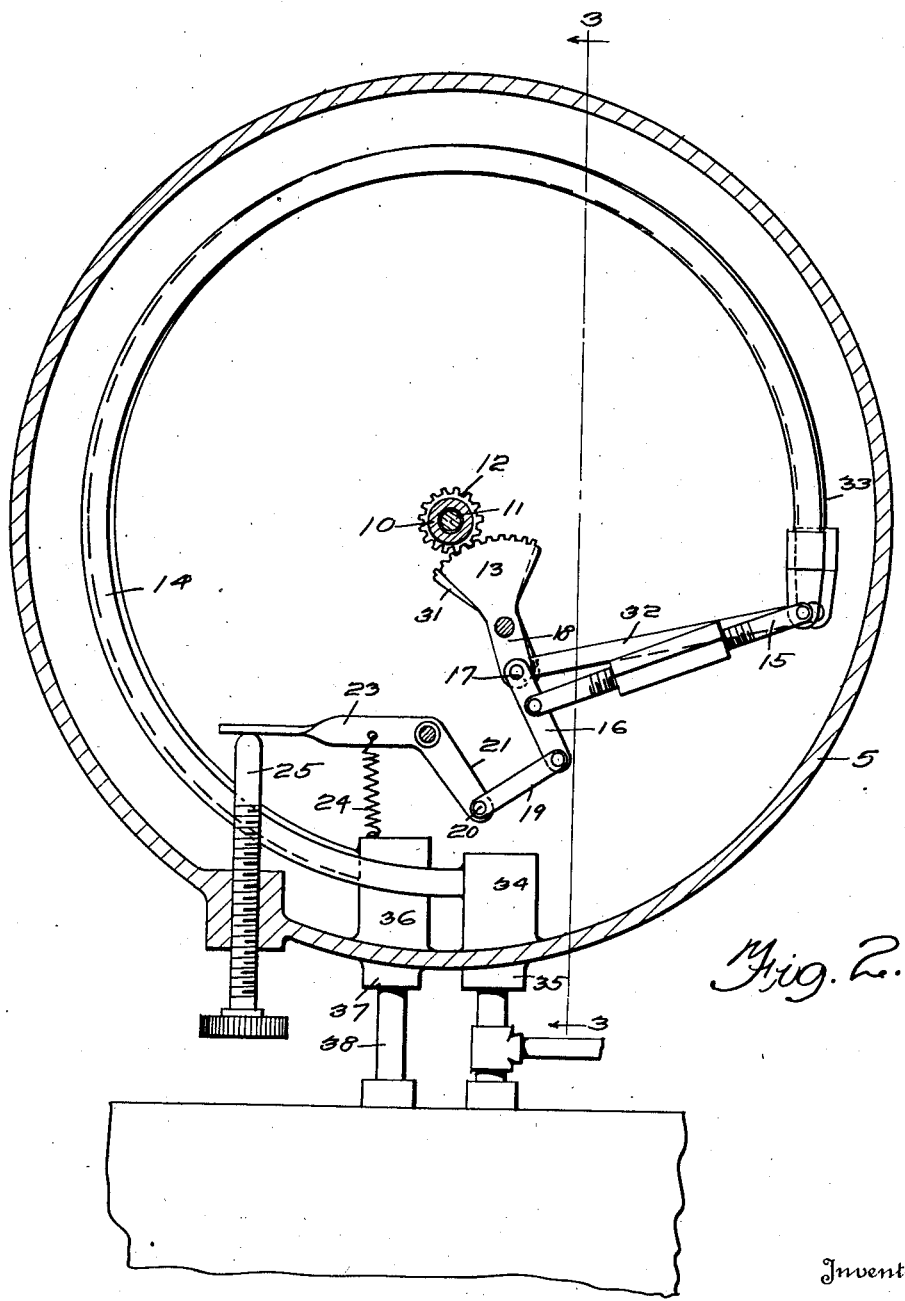
Fig. 2 is a view with the case of the gauge in section and with the operating mechanism of the pointers in elevation.
Figure 3:
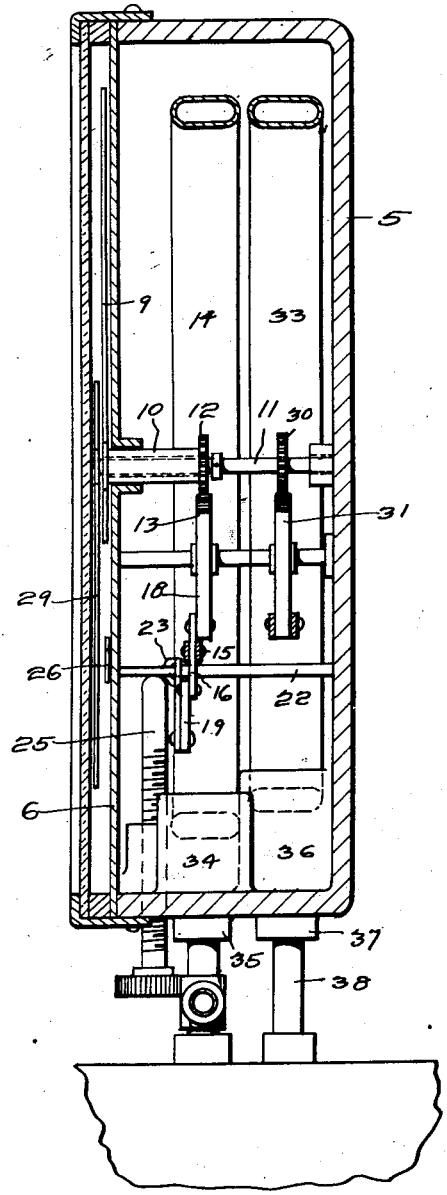
Fig. 3 is a vertical sectional view on line 3—3 of Fig. 2. Like numerals designate corresponding parts in all the figures of the drawings.

In the particular embodiment of the invention chosen for purposes of illustration and shown in the accompanying drawings, 5 designates the case of the gauge and 6 the dial thereof. This dial is provided with a scale 7 which is graduated to indicate pounds pressure per square inch.

A second scale 8 of the dial is graduated to indicate the temperature of vaporization at the existing pressure. A single pointer 9 operates over both of the scales. The pointer 9 is carried by a sleeve 10 which is mounted to rotate upon a shaft 11. The sleeve 10 carries a gear 12 with which a toothed segment 13 is in engagement. Movement is imparted to the segment 13 by a Bourdon tube 14 through an adjustable link 15 and a floating link 16, in the manner illustrated and described in my Patent No. 1,444,098. One end of the link 16 is pivoted at 17 to a tail 18 of the toothed segment 13 and the other end of said link is pivoted to a link 19. The other end of this link 19 is pivoted at 20 to an arm 21 of a bell crank lever. The bell crank lever is mounted on a shaft 22 and the other end 23 of said bell crank lever is drawn by a spring 24 into engagement with an adjusting screw 25. The shaft 22 carries a pointer 26 which lies outside of the dial and operates over a barometric scale 27.

The parts so far described are the same as those of my Patent No. 1,444,098 and need no further description. In carrying forward the ideas hereinbefore outlined I provide upon the dial 6 a temperature scale 28 over which a pointer 29 operates. The pointer 29 is mounted upon the shaft 11 and said shaft is provided with a gear 30, with which a toothed segment 31 meshes. The segment 31 is connected by a link 32 with a Bourdon tube 33. The Bourdon tube 14 terminates in head 34 provided with a connection 35 for attachment with any suitable source of pressure. The Bourdon tube 33 terminates in a head 36 provided with connection 37. A tube 38 and a bulb 39 are connected with the Bourdon tube 33 through the head 36 and the bulb and Bourdon tube are filled with an expansible medium, such as mercury, for example. For purposes of illustration I have shown the Bourdon tube 14 as in communication with coils, which may be the coils 40 of a heat exchanger. The bulb 39 is disposed in the liquid being heated by the coils 40.

Thus it is manifest that the pointer 29 will indicate the temperature of the liquid being heated and that the pointer 9 will indicate both the pressure and the temperature of vaporization of the heating medium and that these two pointers will be disposed in such a relation to each other as to indicate at a glance the "terminal difference" between the temperatures.

While, for the purpose of securing accurate results, it is desirable to associate the thermometric pointer 29 with an absolute pressure gauge of the character described, it is to be understood that the invention includes within its scope the association of such a thermometric pointer with any gauge provided with means for indicating the temperature of vaporization in such a manner that the terminal difference may be ascertained by a mere inspection of the gauge.

Furthermore while I have shown the manual means of my prior patent for effecting compensation for variations of atmospheric pressure it is manifest that the automatic means shown in my prior patents for effecting such compensation automatically under the influence of a barometer, may be just as readily employed. Additionally, I may point out, that while for convenience in description I have illustrated and described the liquid as being heated by steam coils, fluids other than steam may be employed.

In certain special applications the situation might be reversed, that is, a cooling fluid might be giving heat to an evaporating liquid. The pressure gauge would indicate the absolute pressure (and corresponding boiling temperature) of the vapor overlying the liquid receiving heat and evaporating, while the thermometer would indicate the temperature of the material being cooled and thus supplying the heat. In short it is to be understood that the invention covers the gauge itself irrespective of the substances whose temperatures are indicated so long as the result is to indicate the terminal difference between the temperatures of substances, one of which is affected by the other.

Having described my invention what I claim is:

1. A terminal difference gauge comprising pressure responsive means, means controlled by said responsive means to indicate the temperature of vaporization corresponding to the absolute pressure of one medium throughout variations of the existing atmospheric pressure, in combination with a temperature responsive means mechanically separated from the pressure responsive means and disposed in such relation to a second medium that is being acted upon by the first named medium, as to indicate the temperature imparted to said second medium by said first medium and a member common to both the pressure responsive means and the temperature responsive means, the positions of said two means, with respect to each other upon said member, indicating the terminal difference, as described.

2. In combination, a dial having two independent temperature scales thereon, pointers operating thereover, pressure controlled mechanism for effecting the movement of one of said pointers, temperature controlled mechanism for effecting the movement of the other of said pointers, a heat exchanger comprising a path for one medium and a second path for another medium and means for connecting the pressure controlled mechanism of the gauge with the medium in one of said paths and means for connecting the temperature controlled mechanism with the medium in the other of said paths.

3. A terminal difference gauge comprising a dial having a pair of scales thereon, a pair of associated indicators one of which is operatively related to one of said scales and the other of which is operatively related to the other of said scales, temperature controlled means for controlling the first of said indictors and absolute pressure controlled means for controlling the other of said indicators, means for varying the indication of the pressure controlled means in accordance with variations in atmospheric pressure and means for connecting the temperature controlled means and the pressure controlled means to separate bodies of fluid the temperature of one of which is being modified by heat exchange from the other, the movement of the indicators with relation to each other upon said scales indicating the terminal difference between said bodies of fluid.

4. A gauge comprising a dial having a pair of scales thereon, a pair of associated indicators, one of which is operatively related to one of said scales and the other of which is operatively related to both of said scales, temperature controlled means for controlling the first of said indicators, pressure controlled means for controlling the other of said indicators, means for varying the indication of the indicator which is controlled by the pressure controlled means, in accordance with variations in atmospheric pressure, a heat exchanger comprising a path for one medium and a second path for another medium, and means for connecting the pressure controlled mechanism to one of said paths and means for connecting the temperature controlled means to the other of said paths.

5. A terminal difference gauge comprising a dial having three scales thereon one of which is graduated in terms of pounds pressure per square inch, the other of which is graduated in terms of the temperature of vaporization at the then existing atmospheric pressure, and the other of which is graduated in terms of temperature, a pointer co-acting with the last named scale, and a second pointer co-acting with the first two of said scales, Bourdon tubes and connections therewith for actuating said pointers, compensating means associating with the Bourdon tube of the second of said pointers for compensating for variations in atmospheric pressure, the other Bourdon tube constituting a closed chamber, a body of expansible liquid filling said last named Bourdon tube and separate connecting means for the two Bourdon tubes for connecting one of them to a heating fluid under pressure and for connecting the other to a separate body of fluid whose temperature is being modified by heat exchange from the first named body of fluid.

6. In combination, a dial having two independent temperature scales thereon, pointers operating thereover, pressure controlled mechanism for effecting the movement of one of said pointers, temperature controlled mechanism for effecting the movement of the other of said pointers, a heat exchanger comprising a path for a medium being heated and a second path for a heating medium, the latter medium acting upon the former and means for connecting the pressure controlled mechanism of the gauge with the heating medium and means for connecting the temperature controlled mechanism of the gauge with the medium being heated.

In testimony whereof I hereunto affix my signature.

CHARLES HAROLD BERRY.